United States Patent
Sekii et al.

(10) Patent No.: US 10,177,625 B2
(45) Date of Patent: Jan. 8, 2019

(54) MOTOR

(71) Applicant: Nidec Corporation, Kyoto (JP)

(72) Inventors: Yoichi Sekii, Kyoto (JP); Naohiro Nagasawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 228 days.

(21) Appl. No.: 15/168,351

(22) Filed: May 31, 2016

(65) Prior Publication Data

US 2016/0359391 A1 Dec. 8, 2016

(30) Foreign Application Priority Data

Jun. 3, 2015 (JP) .................................. 2015-112795

(51) Int. Cl.
*H02K 7/02* (2006.01)
*H02K 7/08* (2006.01)

(52) U.S. Cl.
CPC ............... *H02K 7/02* (2013.01); *H02K 7/085* (2013.01); *Y02E 60/16* (2013.01)

(58) Field of Classification Search
CPC . H02K 7/02; H02K 7/08; H02K 7/085; G02B 26/008; G11B 19/2009; G11B 19/2027; F16C 17/107
See application file for complete search history.

(56) References Cited

U.S. PATENT DOCUMENTS

| | | | | |
|---|---|---|---|---|
| 6,125,098 A * | 9/2000 | Osawa | ..................... | F16F 15/36 369/266 |
| 6,205,110 B1 * | 3/2001 | Miyamoto | ............ | F16F 15/363 360/99.08 |
| 6,252,319 B1 * | 6/2001 | Sudo | ................... | G11B 17/0282 310/51 |
| 6,452,896 B1 * | 9/2002 | Song | ..................... | G11B 17/038 720/702 |
| 6,982,510 B1 * | 1/2006 | Ajello | .................... | F16C 17/045 310/51 |
| 2005/0200216 A1 * | 9/2005 | Brown | ................... | F04D 29/051 310/90 |
| 2006/0061847 A1 * | 3/2006 | Itami | ..................... | G02B 7/1821 359/200.4 |
| 2007/0052311 A1 | 3/2007 | Nagata et al. | | |

(Continued)

FOREIGN PATENT DOCUMENTS

| JP | 9-217738 A | 8/1997 |
|---|---|---|
| JP | 2004-225740 A | 8/2004 |
| JP | 2006-353058 A | 12/2006 |

OTHER PUBLICATIONS

Sekii; "Motor"; U.S. Appl. No. 15/171,179, filed Jun. 2, 2016.
Sekii; "Motor"; U.S. Appl. No. 15/168,327, filed May 31, 2016.

*Primary Examiner* — Tran Nguyen
(74) *Attorney, Agent, or Firm* — Keating & Bennett, LLP

(57) ABSTRACT

A motor includes a rotating portion. The rotating portion includes a shaft, a rotor hub, and a flywheel. The rotor hub is arranged to extend in an annular shape around the shaft. The flywheel is arranged axially above the rotor hub. The rotor hub includes a joining portion fixed to an outer circumferential surface of the shaft. A center of gravity of the rotating portion and the joining portion of the rotor hub are arranged to radially overlap with each other. The center of gravity of the rotating portion is arranged axially above a radial bearing portion and at a level equivalent to the level of the joining portion.

18 Claims, 14 Drawing Sheets

(56) References Cited

U.S. PATENT DOCUMENTS

2009/0115275 A1    5/2009  Higashihara et al.
2014/0183987 A1*   7/2014  Sekii .................... H02K 5/225
                                                            310/52
2015/0069868 A1*   3/2015  Ricketts ............... H02K 7/102
                                                            310/77

* cited by examiner

MOTOR

BACKGROUND OF THE INVENTION

1. Field of the Invention

The present invention relates to a motor.

2. Description of the Related Art

A disk drive apparatus, such as, for example, a hard disk drive, is typically equipped with a motor (i.e., an FDB motor) including a fluid dynamic bearing. In the FDB motor, a lubricating oil is arranged between a sleeve of a stationary portion and a shaft of a rotating portion. A dynamic pressure groove is defined in an inner circumferential surface of the sleeve or an outer circumferential surface of the shaft, and while the motor is running, the dynamic pressure groove induces a dynamic pressure in the lubricating oil. This allows the rotating portion including the shaft to rotate with high precision.

Thus, in recent years, FDB motors have sometimes been used also in applications other than disk drive apparatuses. However, when the FDB motor is used in an application other than the disk drive apparatus, an additional component, such as, for example, a flywheel, is sometimes attached to the rotating portion of the FDB motor. Such an additional component changes the position of a center of gravity of the rotating portion. Depending on the position of the center of gravity, a large stress may be exerted on a junction of the shaft and a rotor hub while the motor is running. Damage, such as, for example, a rupture, may thus be easily caused to the junction of the shaft and the rotor hub.

SUMMARY OF THE INVENTION

A motor according to a preferred embodiment of the present invention includes a stationary portion and a rotating portion. The rotating portion is supported to be rotatable about a central axis extending in a vertical direction with respect to the stationary portion. The rotating portion includes a shaft, a rotor hub, and a flywheel. The shaft is arranged to extend along the central axis. The rotor hub is arranged to extend in an annular shape around the shaft. The flywheel is arranged axially above the rotor hub. The stationary portion includes a sleeve arranged to rotatably support the shaft. The motor further includes a radial bearing portion where the sleeve and the shaft are arranged radially opposite to each other with a lubricating oil arranged therebetween. The rotor hub includes a joining portion fixed to an outer circumferential surface of the shaft axially above the radial bearing portion. A center of gravity of the rotating portion and the joining portion are arranged to radially overlap with each other.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, motors according to preferred embodiments of the present invention will be described. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a flywheel is arranged with respect to a rotor hub is an upper side, and the shape of each member or portion and relative positions of different members or portions will be described based on the above assumptions. It should be noted, however, that the above definitions of the vertical direction and the upper and lower sides are not meant to restrict in any way the orientation of a motor according to any preferred embodiment of the present invention at the time of manufacture or when in use.

Figure 1:
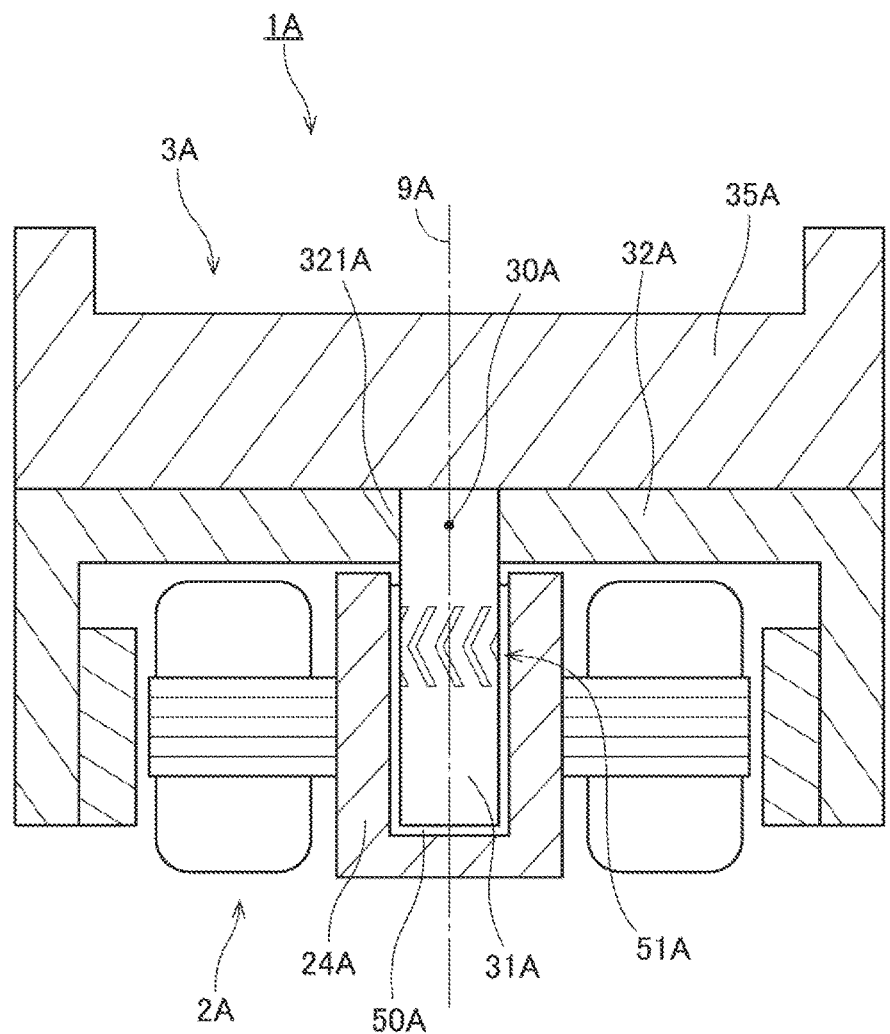
FIG. 1 is a vertical cross-sectional view of a motor according to a first preferred embodiment of the present invention.

FIG. 1 is a vertical cross-sectional view of a motor 1A according to a first preferred embodiment of the present invention. Referring to FIG. 1, the motor 1A includes a stationary portion 2A and a rotating portion 3A. The rotating portion 3A is supported to be rotatable about a central axis 9A with respect to the stationary portion 2A.

The rotating portion 3A includes a shaft 31A, a rotor hub 32A, and a flywheel 35A. The shaft 31A is arranged to extend along the central axis 9A. The rotor hub 32A is arranged to extend in an annular shape around the shaft 31A. The rotor hub 32A includes a joining portion 321A fixed to an outer circumferential surface of the shaft 31A. The flywheel 35A is arranged axially above the rotor hub 32A. The stationary portion 2A includes a sleeve 24A arranged to rotatably support the shaft 31A.

The motor 1A includes a radial bearing portion 51A. At the radial bearing portion 51A, the sleeve 24A and the shaft 31A are arranged radially opposite to each other with a lubricating oil 50A arranged therebetween. The joining portion 321A of the rotor hub 32A is arranged axially above the radial bearing portion 51A.

In the motor 1A, a center 30A of gravity of the rotating portion 3A and the joining portion 321A of the rotor hub 32A are arranged to radially overlap with each other. That is, the center 30A of gravity of the rotating portion 3A is arranged axially above the radial bearing portion 51A and at a level equivalent to the level of the joining portion 321A. This contributes to reducing the range of swinging of the rotating portion 3A in the vicinity of the joining portion 321A even if the rotating portion 3A swings while the motor 1A is running. This in turn contributes to preventing damage, such as, for example, a rupture, to the joining portion 321A.

Figure 2:
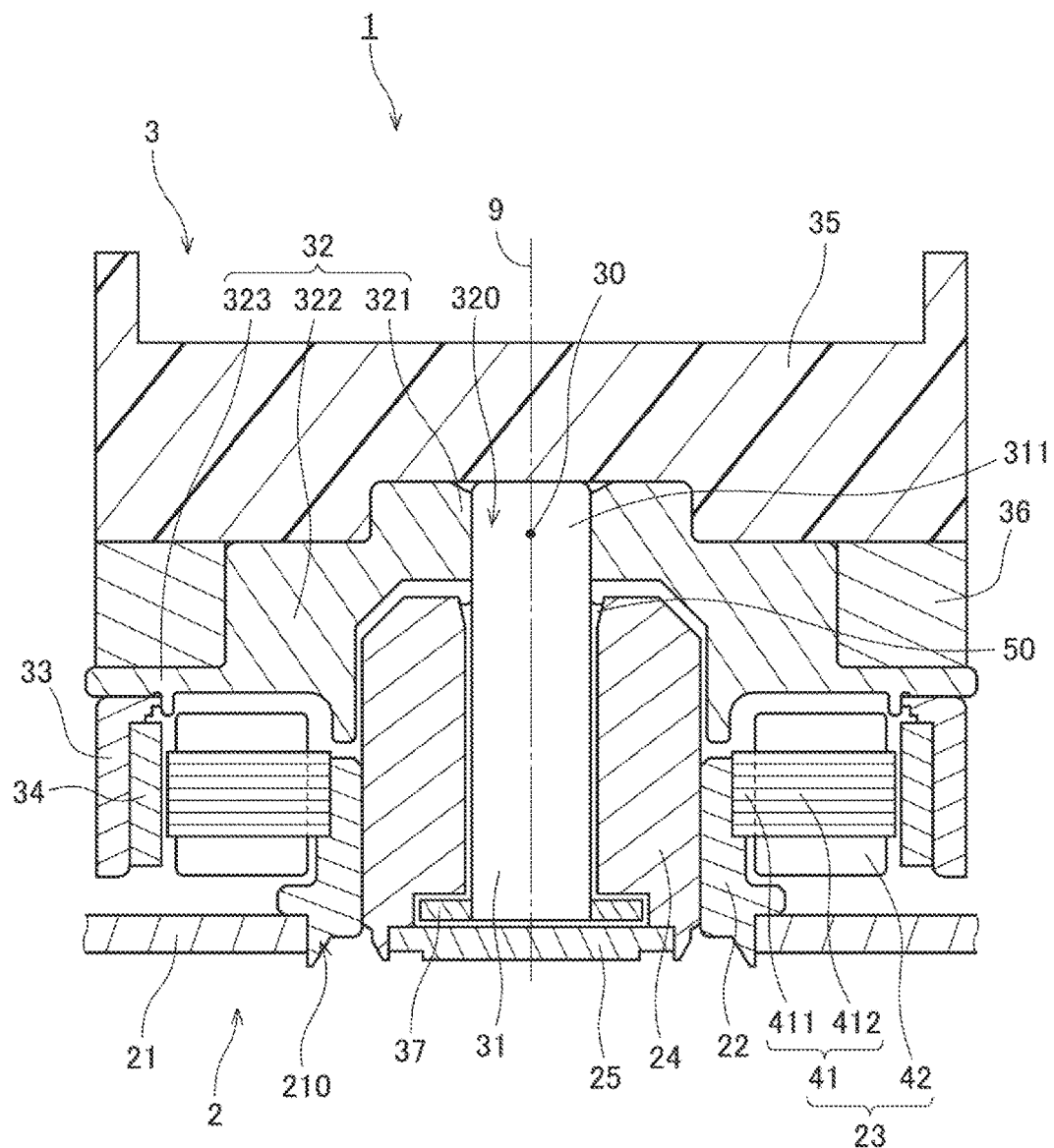
FIG. 2 is a vertical cross-sectional view of a motor according to a second preferred embodiment of the present invention.

FIG. 2 is a vertical cross-sectional view of a motor 1 according to a second preferred embodiment of the present invention. Referring to FIG. 2, the motor 1 includes a stationary portion 2 and a rotating portion 3. The rotating portion 3 is supported to be rotatable about a central axis 9 extending in a vertical direction with respect to the stationary portion 2.

The stationary portion 2 preferably includes a mounting plate 21, a stator holder 22, a stator 23, and a sleeve 24.

The mounting plate 21 is a plate-shaped member arranged to support the stator holder 22. A metal, such as, for example, stainless steel, is used as a material of the mounting plate 21. The mounting plate 21 is arranged to be substantially perpendicular to the central axis 9. The mounting plate 21 includes a through hole 210 including an opening edge which is circular in a plan view. A lower end portion of the stator holder 22 is fitted in the through hole 210. When the motor 1 is fitted to a device or the like, the mounting plate 21 is fixed to a frame of the device or the like through, for example, screws. Note that a circuit board to supply electric drive currents to coils 42 of the stator 23, which will be described below, may be arranged on a surface of the mounting plate 21.

The stator holder 22 is a substantially cylindrical member extending in the axial direction. The lower end portion of the stator holder 22 is inserted into the through hole 210, and is fixed to the mounting plate 21 preferably by crimping. Note, however, that the stator holder 22 may alternatively be fixed to the mounting plate 21 by another method, such as, for example, welding. Also note that the mounting plate 21 and the stator holder 22 may alternatively be defined by a single continuous monolithic member.

The stator 23 includes a stator core 41 and the coils 42. The stator core 41 is defined by, for example, laminated steel sheets, each of which is a magnetic body. The stator core 41 includes an annular core back 411 and a plurality of teeth 412. The stator holder 22 is inserted into a through hole of the core back 411. The core back 411 is fixed to an outer circumferential surface of the stator holder 22. The core back 411 is fixed to the stator holder 22 through, for example, press fitting, adhesion, or the like. The teeth 412 are arranged to project radially outward from the core back 411. A surface of the stator core 41, including the teeth 412, is coated with an insulating coating. A conducting wire is wound around each of the teeth 412 to define the coils 42. Note that, in place of the insulating coating, an insulator made of a resin may be arranged between the teeth 412 and the coils 42. Also note that the stator core 41 may alternatively be defined by a dust core.

The sleeve 24 is a member arranged to rotatably support a shaft 31, which will be described below. The sleeve 24 is a substantially cylindrical member, and is arranged to extend in the axial direction around the shaft 31. A lower portion of the sleeve 24 is inserted into a space radially inside the stator holder 22, (i.e., into a through hole of the stator holder 22), and is fixed to the stator holder 22 through, for example, an adhesive. An upper end portion of the sleeve 24 is arranged axially above both an upper end portion of the stator holder 22 and an upper end portion of the stator 23. An opening at a lower end portion of the sleeve 24 is closed by a disk-shaped cap 25.

The rotating portion 3 preferably includes the shaft 31, a rotor hub 32, a yoke 33, a magnet 34, a flywheel 35, and an inertia portion 36.

The shaft 31 is a columnar member arranged to extend along the central axis 9. A metal, such as, for example, stainless steel, is used as a material of the shaft 31. A lower end portion of the shaft 31 is arranged radially inside of the sleeve 24 (i.e., in a through hole of the sleeve 24). An upper end portion 311 of the shaft 31 is arranged axially above the upper end portion of the sleeve 24. An outer circumferential surface of the shaft 31 is arranged radially opposite to an inner circumferential surface of the sleeve 24 with a slight gap therebetween.

An annular thrust plate 37 is fixed to the lower end portion of the shaft 31. The thrust plate 37 is arranged to extend radially outward from a lower end of the shaft 31. An upper surface of the thrust plate 37 is arranged axially opposite to a lower surface of the sleeve 24 with a slight gap therebetween. A lower surface of the thrust plate 37 is arranged axially opposite to an upper surface of the cap 25 with a slight gap therebetween.

The rotor hub 32 is arranged to extend in an annular shape around the shaft 31. A metal, such as, for example, an aluminum alloy, is used as a material of the rotor hub 32. Referring to FIG. 2, the rotor hub 32 preferably includes a joining portion 321, a cylindrical portion 322, and a flange portion 323. The joining portion 321 is arranged at a radially innermost portion of the rotor hub 32, and is fixed to the outer circumferential surface of the shaft 31. The joining portion 321 is arranged axially above a radial bearing portion 51, which will be described below. A through hole 320 passing through the rotor hub 32 in the axial direction is defined radially inside of the joining portion 321. The upper end portion 311 of the shaft 31 is press fitted in the through hole 320 of the rotor hub 32.

Figure 3:
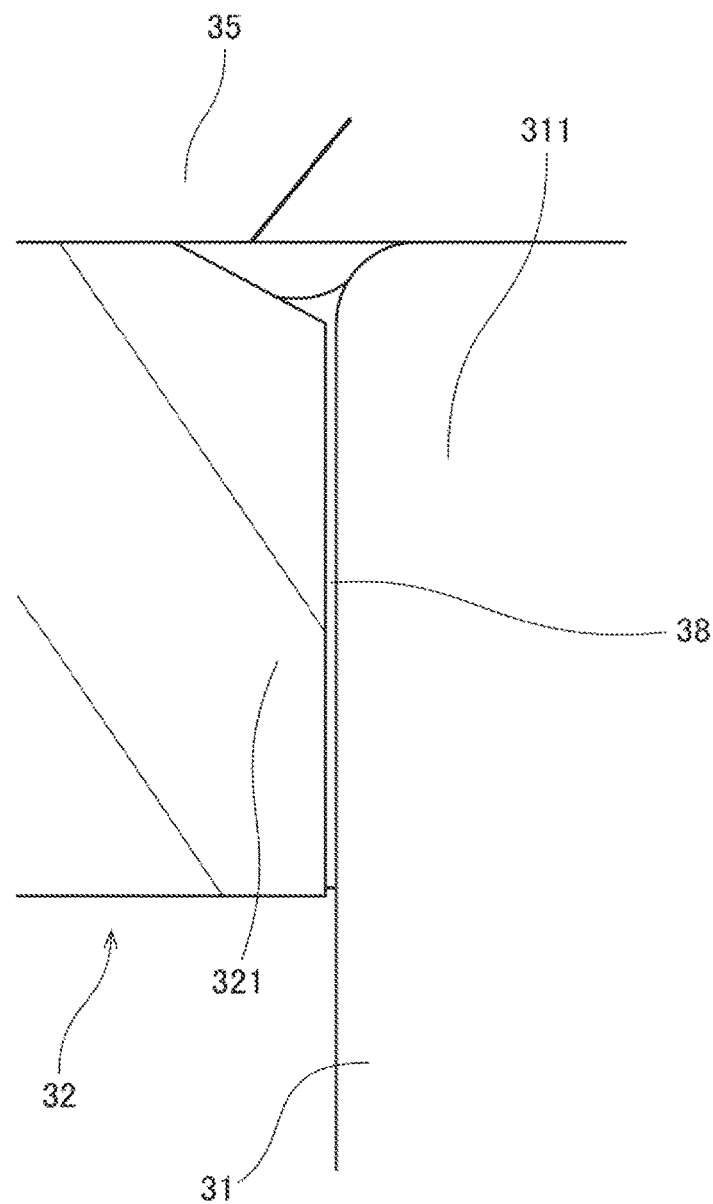
FIG. 3 is a partial vertical cross-sectional view illustrating a joining portion and its vicinity according to second preferred embodiment of the present invention.

FIG. 3 is a partial vertical cross-sectional view illustrating the joining portion 321 and its vicinity. Referring to FIG. 3, an adhesive 38 is arranged between an outer circumferential surface of the upper end portion 311 of the shaft 31 and an inner circumferential surface of the joining portion 321. In the motor 1, the shaft 31 and the rotor hub 32 are fixed to each other through press fitting and the adhesive 38. Note, however, that the shaft 31 and the rotor hub 32 may alternatively be fixed to each other through only press fitting or through only the adhesive 38. Also note that the shaft 31 and the rotor hub 32 may alternatively be fixed to each other by another method, such as, for example, shrink fitting.

Referring to FIG. 2, the cylindrical portion 322 is cylindrical, and is arranged to extend in the axial direction. The cylindrical portion 322 is arranged radially outward of the joining portion 321 and radially inward of the inertia portion 36, which will be described below. The flange portion 323 is arranged to extend radially outward from a lower end portion of the cylindrical portion 322. The flange portion 323 is arranged axially below the inertia portion 36.

The yoke 33 is a cylindrical member arranged to hold the magnet 34. The yoke 33 is arranged to be coaxial or substantially coaxial with the central axis 9. A magnetic material, such as, for example, iron, is used as a material of the yoke 33. An upper end portion of the yoke 33 is fixed to a lower surface of the flange portion 323 through, for example, an adhesive or the like.

The magnet 34 is fixed to an inner circumferential surface of the yoke 33 through, for example, an adhesive or the like. In the motor 1, an annular permanent magnet is used as the magnet 34. An inner circumferential surface of the magnet 34 includes north and south poles arranged to alternate with each other in a circumferential direction. Note, however, that the magnet 34 may not necessarily be annular, and that a plurality of magnets may alternatively be used in place of the magnet 34. In the case where a plurality of magnets are used, a plurality of magnets 34 are arranged on the inner circumferential surface of the yoke 33 such that north and south poles alternate with each other in the circumferential direction.

Once the electric drive currents are supplied to the coils 42, a rotating magnetic field is generated in the teeth 412. Interaction between magnetic flux of the teeth 412 and magnetic flux of the magnet 34 produces a circumferential torque. This allows the rotating portion 3, including the magnet 34, to rotate about the central axis 9.

The flywheel 35 is arranged axially above the rotor hub 32. The flywheel 35 is fixed to the rotor hub 32 through, for example, an adhesive. Accordingly, the flywheel 35 rotates together with the rotor hub 32 while the motor 1 is running. An ABS resin, which is a thermoplastic resin, for example, is used as a material of the flywheel 35. Note that, instead of the ABS resin, another material, such as, for example, a thermosetting resin or a metal, may alternatively be used as the material of the flywheel 35. The flywheel 35 is able to achieve a lower weight when the flywheel 35 is made of a resin than when the flywheel 35 is made of a metal. Use of a resin for the flywheel 35 therefore leads to reducing a load during rotation of the motor 1.

In the motor 1, the flywheel 35 is arranged to have a circular external shape when viewed in the axial direction with the central axis 9 as a center. This circular external shape of the flywheel 35 contributes to reducing swinging of the rotating portion 3 while the motor 1 is running.

The inertia portion 36 is an annular member. The inertia portion 36 is arranged radially outside of the cylindrical portion 322, axially above the flange portion 323, and axially below the flywheel 35. A lower surface of the inertia portion 36 is arranged to be in contact with an upper surface of the flange portion 323. The inertia portion 36 is fixed to the rotor hub 32 through, for example, an adhesive or the like. Accordingly, the inertia portion 36 is able to rotate together with the rotor hub 32 and the flywheel 35 while the motor 1 is running.

A metal, such as, for example, stainless steel, is used as a material of the inertia portion 36. The inertia portion 36 is arranged to have a predetermined gravity greater than a predetermined gravity of the flywheel 35. The inertia portion 36 fixed to the rotor hub 32 therefore increases an inertial force of the rotating portion 3 when the motor 1 is running. This leads to stabilizing the posture of the rotating portion 3 when the rotating portion 3 is rotating. In particular, in the motor 1, the inertia portion 36 is arranged to have a total mass greater than a total mass of the flywheel 35. This leads to further stabilizing the posture of the rotating portion 3 when the rotating portion 3 is rotating. Note that the inertia portion 36 may not necessarily be arranged to have a total mass greater than the total mass of the flywheel 35. That is, the inertia portion 36 may alternatively be arranged to have a total mass smaller than the total mass of the flywheel 35.

Figure 4:
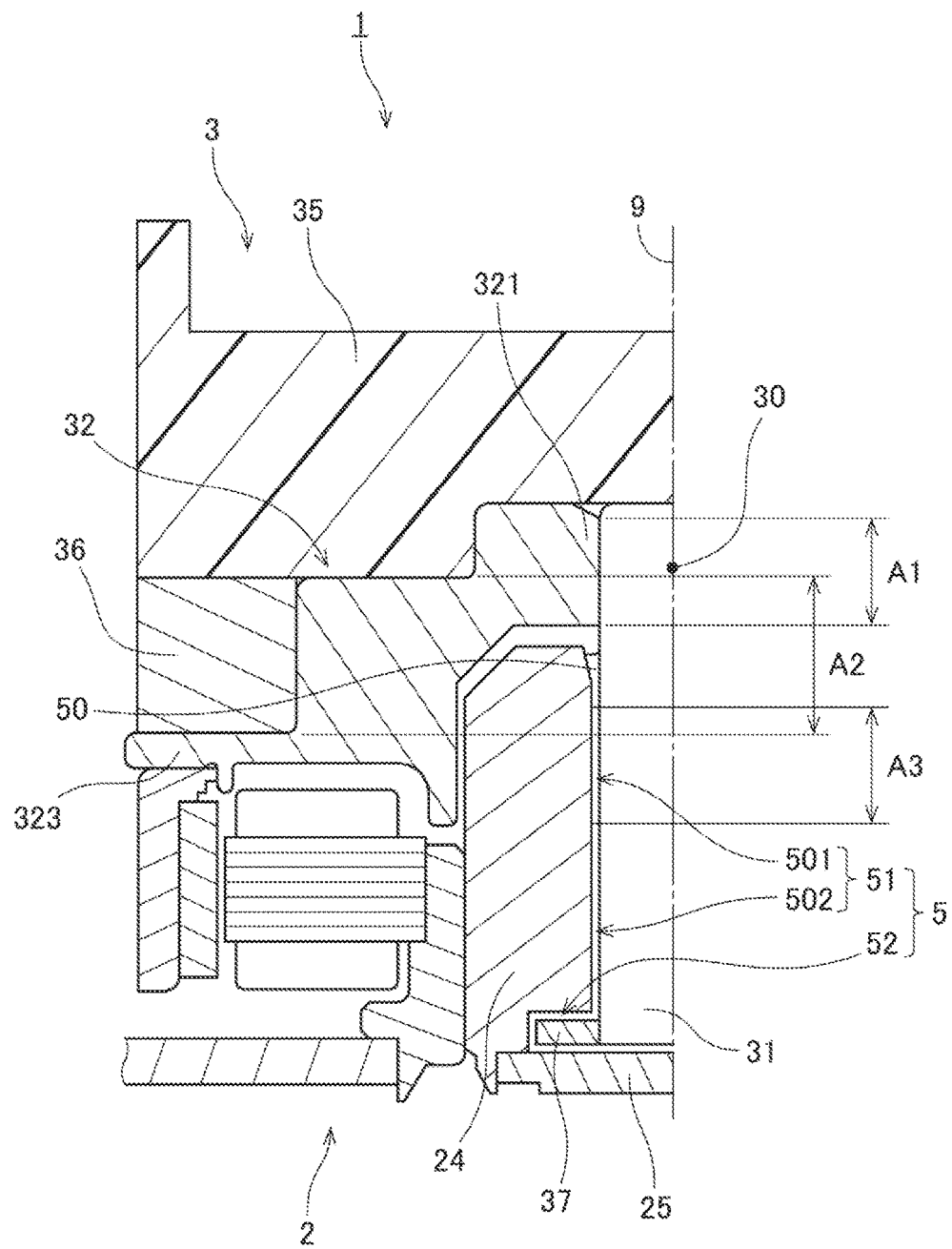
FIG. 4 is a partial vertical cross-sectional view of the motor according to the second preferred embodiment of the present invention.

Next, a fluid dynamic bearing mechanism 5 included in the motor 1 will now be described below. FIG. 4 is a partial vertical cross-sectional view of the motor 1. Referring to FIG. 4, a lubricating oil 50 is arranged between a combination of the sleeve 24 and the cap 25 and a combination of the shaft 31 and the thrust plate 37. A polyolester oil, a diester oil, or the like, for example, is used as the lubricating oil 50.

Figure 5:
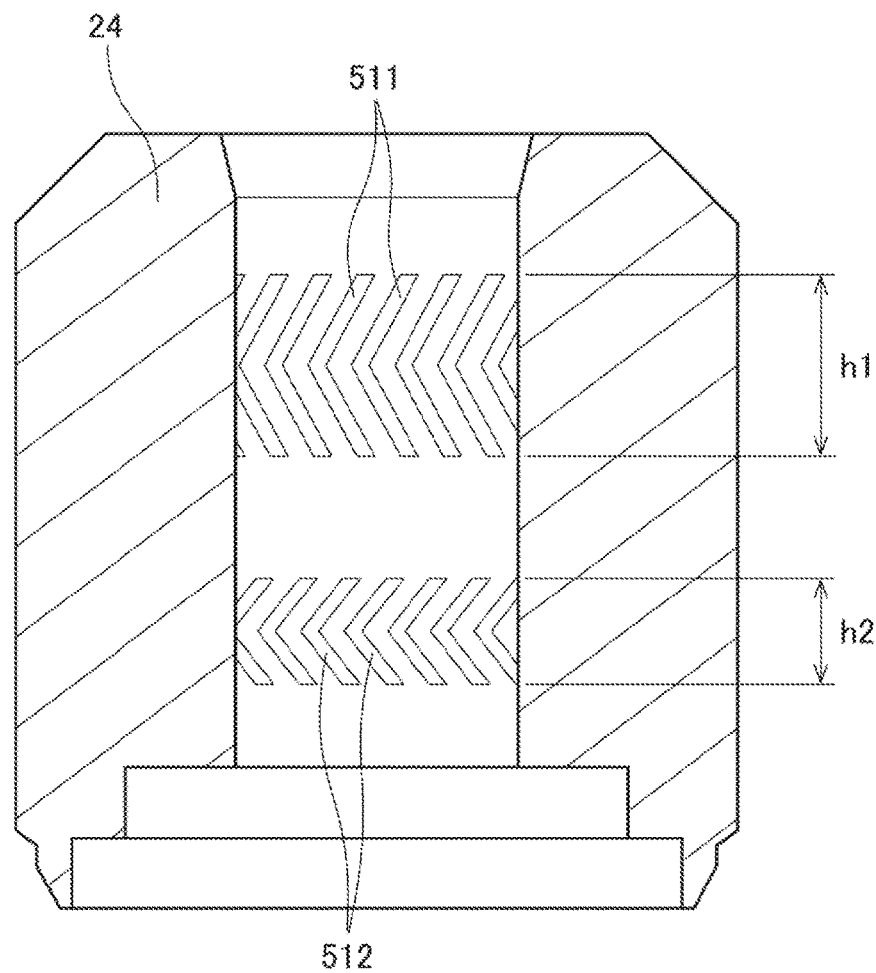
FIG. 5 is a vertical cross-sectional view of a sleeve according to the second preferred embodiment of the present invention.

FIG. 5 is a vertical cross-sectional view of the sleeve 24. Referring to FIG. 5, the inner circumferential surface of the sleeve 24 includes an upper radial groove array 511 and a lower radial groove array 512. The lower radial groove array 512 is arranged axially below the upper radial groove array 511. Each of the upper and lower radial groove arrays 511 and 512 is a groove array arranged in a so-called herringbone pattern. While the motor 1 is running, the upper and lower radial groove arrays 511 and 512 induce a dynamic pressure in a portion of the lubricating oil 50 which is present between the inner circumferential surface of the sleeve 24 and the outer circumferential surface of the shaft 31. This produces a radial supporting force between the sleeve 24 and the shaft 31.

That is, in the motor 1, the inner circumferential surface of the sleeve 24 is arranged radially opposite to the outer circumferential surface of the shaft 31 with the lubricating oil 50 arranged therebetween. The radial bearing portion 51 is thus defined. The radial bearing portion 51 includes an upper radial bearing portion 501 arranged to generate a dynamic pressure through the upper radial groove array 511, and a lower radial bearing portion 502 arranged to generate a dynamic pressure through the lower radial groove array 512. The lower radial bearing portion 502 is arranged axially below the upper radial bearing portion 501. Note that each of the upper and lower radial groove arrays 511 and 512 is defined in at least one of the inner circumferential surface of the sleeve 24 and the outer circumferential surface of the shaft 31. Also note that the number of radial dynamic pressure groove arrays may alternatively be one or more than two.

Figure 6:
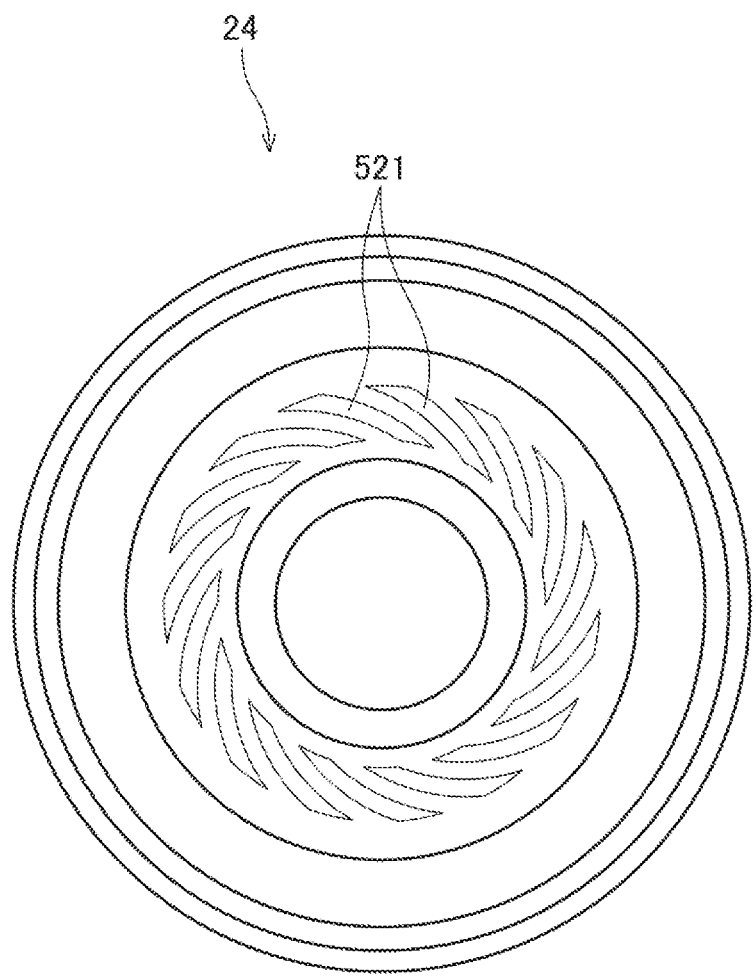
FIG. 6 is a bottom view of the sleeve according to the second preferred embodiment of the present invention.

FIG. 6 is a bottom view of the sleeve 24. Referring to FIG. 6, the sleeve 24 includes a thrust groove array 521 in the lower surface thereof. The thrust groove array 521 includes a plurality of thrust grooves arranged in the circumferential direction. Each thrust groove is arranged to extend radially in a spiral shape. Note that the thrust groove array 521 may alternatively be arranged in a herringbone pattern. While the motor 1 is running, the thrust groove array 521 induces a dynamic pressure in a portion of the lubricating oil 50 which is present between the lower surface of the sleeve 24 and the upper surface of the thrust plate 37. This produces an axial supporting force between the sleeve 24 and the thrust plate 37.

That is, in the motor 1, the lower surface of the sleeve and the upper surface of the thrust plate 37 are arranged axially opposite to each other with the lubricating oil 50 arranged therebetween. A thrust bearing portion 52 is thus defined. Note that the thrust groove array 521 is defined in at least one of the lower surface of the sleeve 24 and the upper surface of the thrust plate 37. Also note that the number of thrust bearing portions 52 may be two or more. The thrust bearing portion 52 may be defined between the upper surface of the cap 25 and the lower surface of the thrust plate 37.

A gap including the radial bearing portion 51 and the thrust bearing portion 52 is defined between the combination of the sleeve 24 and the cap 25 and the combination of the shaft 31 and the thrust plate 37. This gap is continuously filled with the lubricating oil 50. A liquid surface of the lubricating oil 50 is defined between the outer circumferential surface of the shaft 31 and the inner circumferential surface of the sleeve 24 in the vicinity of the upper end portion of the sleeve 24. The fluid dynamic bearing mechanism 5 of the motor 1 is arranged to have a so-called full-fill structure. The fluid dynamic bearing mechanism 5 of the motor 1 according to this preferred embodiment includes only one liquid surface of the lubricating oil 50. The full-fill structure of the fluid dynamic bearing mechanism 5 contributes to reducing swinging of the rotating portion 3 due to the orientation of the motor 1 installed, a vibration, and/or the like.

Referring to FIGS. 2 and 4, a center 30 of gravity of the rotating portion 3 of the motor 1 is arranged in the vicinity of the upper end portion 311 of the shaft 31. The shaft 31 and the rotor hub 32 are fixed to each other radially outside of the center 30 of gravity. That is, in the motor 1, the center 30 of gravity of the rotating portion 3 and the joining portion 321 of the rotor hub 32 are arranged to radially overlap with each other. Accordingly, the center 30 of gravity of the rotating portion 3 is arranged axially above the radial bearing portion 51 and at a level equivalent to the level of the joining portion 321.

Thus, even if the rotating portion 3 swings while the motor 1 is running, a load applied by this swinging between the shaft 31 and the joining portion 321 is reduced. For example, if the center 30 of gravity of the rotating portion 3 were located axially below the joining portion 321, a swing of the rotating portion 3 centered on the center 30 of gravity would cause a large range of swinging of the rotating portion 3 in the vicinity of the joining portion 321. However, according to this preferred embodiment, the center 30 of gravity of the rotating portion 3 and the joining portion 321 are arranged axially close to each other, and therefore, the range of swinging of the rotating portion 3 in the vicinity of the joining portion 321 is small. This contributes to preventing damage, such as, for example, a rupture, to the joining portion 321.

A reduced axial dimension of a motor generally makes it difficult to ensure a large axial dimension of a joining portion of a rotor hub. Therefore, it is also made difficult to increase the strength of the joining portion itself against a swing. However, arranging the center 30 of gravity of the rotating portion 3 at a level equivalent to the level of the joining portion 321 as described above achieves a reduced range of swinging of the joining portion 321 and a reduced likelihood of damage, such as, for example, a rupture, to the joining portion 321. That is, the above-described structure of the motor 1 makes it possible to achieve both a reduced thickness of the motor 1 and a reduced likelihood of damage to the joining portion 321 at the same time.

In the motor 1, at least a portion of the joining portion 321 and at least a portion of the inertia portion 36 are arranged to radially overlap with each other. Specifically, referring to FIG. 4, a lower portion of an axial range A1 in which the joining portion 321 extends is arranged to overlap with an upper portion of an axial range A2 in which the inertia portion 36 extends. This overlap makes the joining portion 321 and the inertia portion 36 closer to each other. This reduces a load exerted by the inertia portion 36, which has a large predetermined gravity, on the joining portion 321. This in turn contributes to more effectively preventing damage, such as, for example, a rupture, to the joining portion 321.

In the motor 1, at least a portion of the inertia portion 36 and at least a portion of the radial bearing portion 51 are arranged to radially overlap with each other. Specifically, referring to FIG. 4, a lower portion of the axial range A2 in which the inertia portion 36 extends is arranged to overlap with an upper portion of an axial range A3 in which the upper radial bearing portion 501 extends. Accordingly, the upper radial bearing portion 501 supports the rotating portion 3 at a level equivalent to the level of the inertia portion 36, which has a large predetermined gravity. This leads to a more stable posture of the rotating portion 3 during rotation. A stable posture of the rotating portion 3 leads to a further reduction in the likelihood that damage to the joining portion 321 will be caused by the swinging of the rotating portion 3.

Referring to FIG. 5, in the motor 1, an axial dimension h1 of the upper radial groove array 511 is arranged to be greater than an axial dimension h2 of the lower radial groove array 512. Therefore, an axial dimension of the upper radial bearing portion 501 is greater than an axial dimension of the lower radial bearing portion 502. This causes the lubricating oil 50 to generate a greater dynamic pressure at a position closer to the center 30 of gravity of the rotating portion 3. This leads to a more stable posture of the rotating portion 3 during rotation. This in turn leads to a further reduction in the likelihood that damage to the joining portion 321 will be caused by the swinging of the rotating portion 3.

While an exemplary preferred embodiment of the present invention has been described above, it will be understood that the present invention is not limited to the above-described preferred embodiment.

Figure 7:
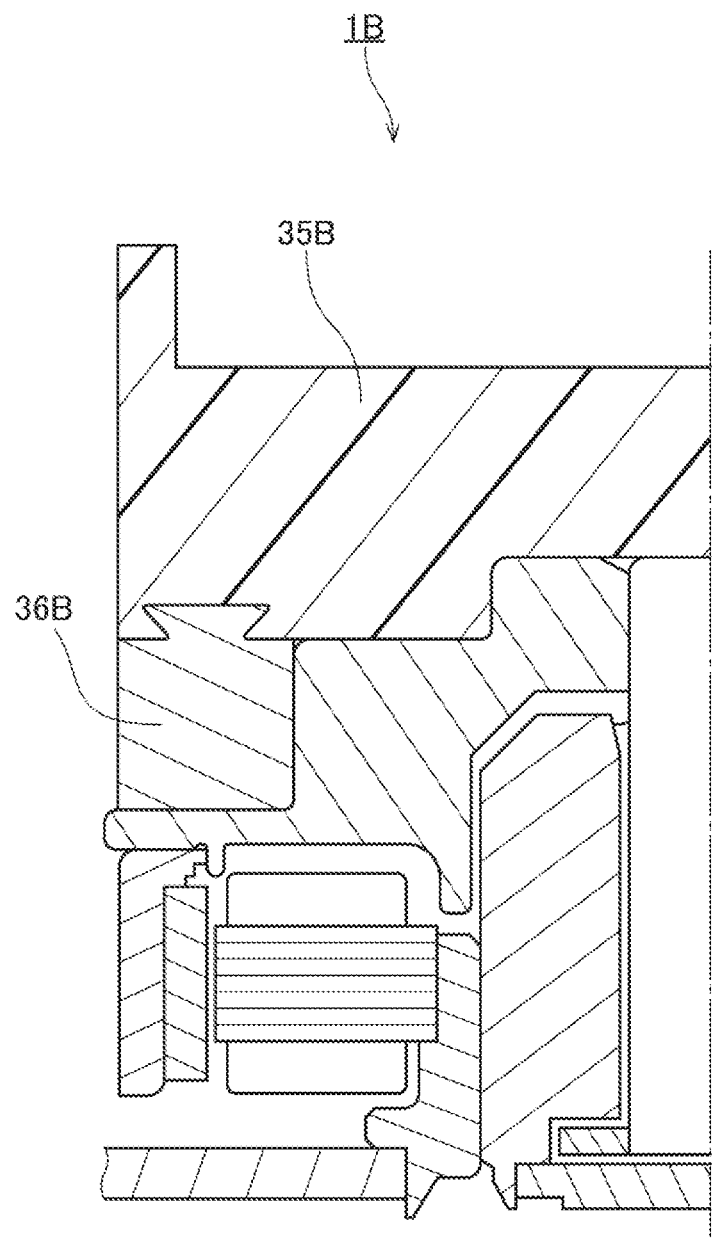
FIG. 7 is a partial vertical cross-sectional view of a motor according to an example modification of the second preferred embodiment of the present invention.

FIG. 7 is a partial vertical cross-sectional view of a motor 1B according to an example modification of the above-described preferred embodiment of the present invention. A flywheel 35B in FIG. 7 is a resin-molded article produced with an inertia portion 36B as an insert. That is, a molten resin is poured into a cavity of a mold with the inertia portion 36B arranged in the mold, and the resin is cured to mold the flywheel 35B. This achieves the molding of the flywheel 35B and the fixing of the flywheel 35B to the inertia portion 36B at the same time. Thus, a reduction in the number of processes to manufacture the motor 1B is achieved. Moreover, the flywheel 35B and the inertia portion 36B are fixed to each other with increased strength.

Figure 8:
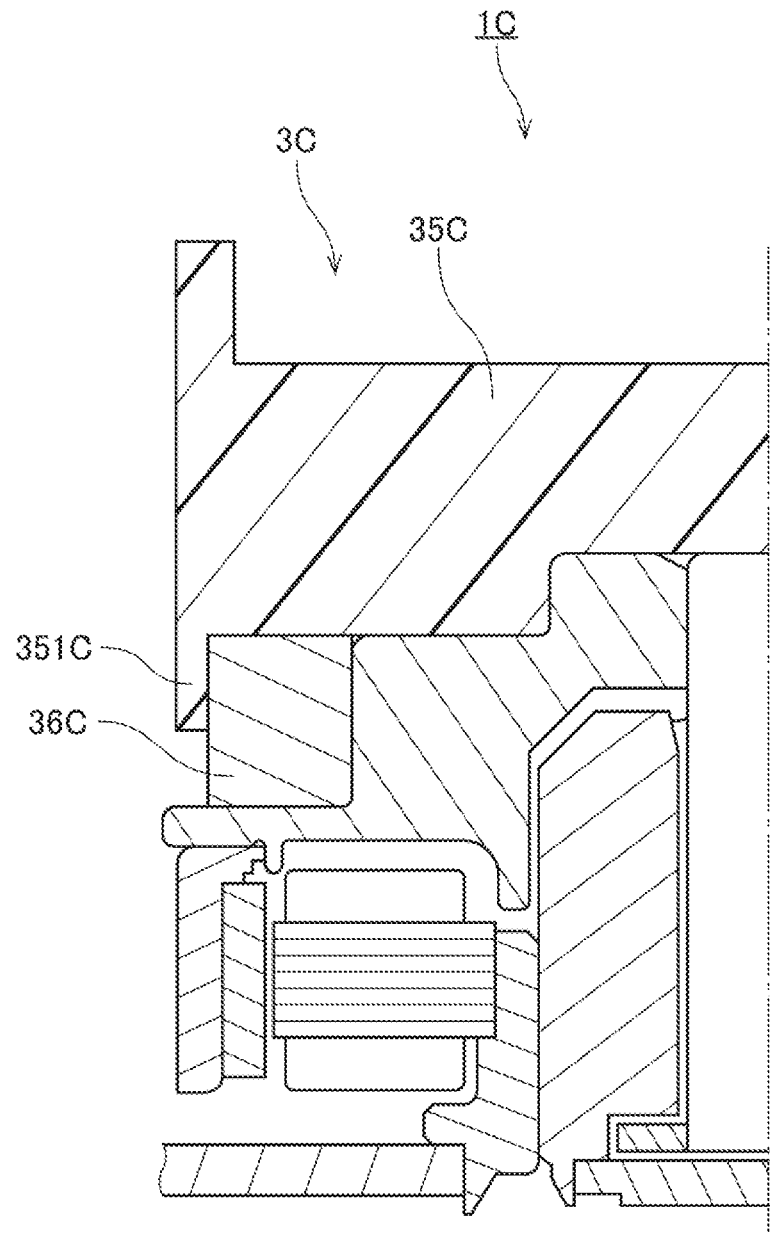
FIG. 8 is a partial vertical cross-sectional view of a motor according to an example modification of the second preferred embodiment of the present invention.

FIG. 8 is a partial vertical cross-sectional view of a motor 1C according to another example modification of the above-described preferred embodiment of the present invention. A flywheel 35C in FIG. 8 includes a cylindrical wall portion 351C arranged to extend axially downward from an outer circumferential portion thereof. The wall portion 351C is arranged to cover at least a portion of an outer circumferential surface of an inertia portion 36C. That is, an upper end portion of the inertia portion 36C is fitted radially inside of the wall portion 351C. In other words, the upper end portion of the inertia portion 36C is fitted in a hole defined by an inside surface of the wall portion 351C. This reduces the likelihood that relative positions of the flywheel 35C and the inertia portion 36C will be disturbed. This contributes to further reducing swinging of a rotating portion 3C while the motor 1C is running.

Note that the wall portion 351C may not necessarily be cylindrical. For example, the flywheel 35C may include a plurality of arc-shaped wall portions arranged in the circumferential direction in place of the cylindrical wall portion 351C.

Figure 9:
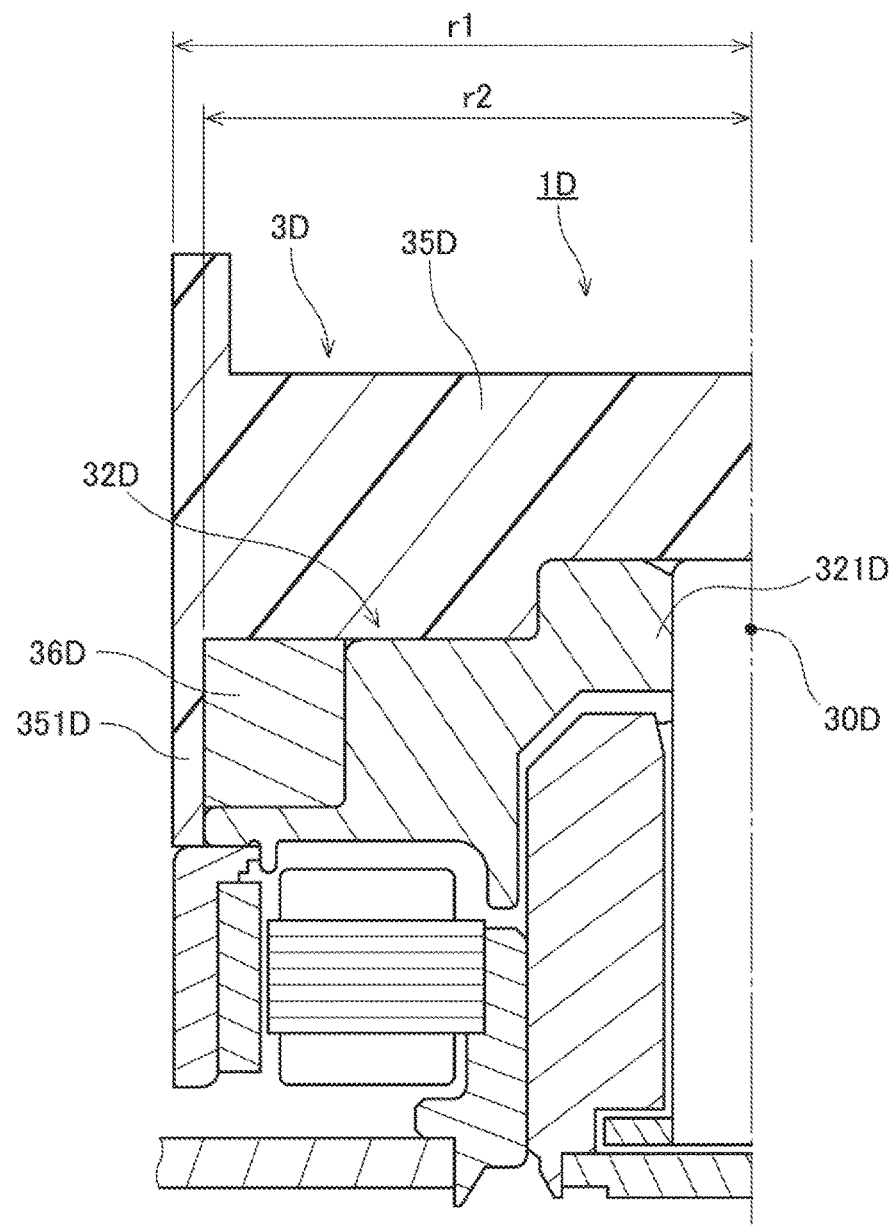
FIG. 9 is a partial vertical cross-sectional view of a motor according to an example modification of the second preferred embodiment of the present invention.

FIG. 9 is a partial vertical cross-sectional view of a motor 1D according to yet another example modification of the above-described preferred embodiment of the present invention. A flywheel 35D in FIG. 9 includes a cylindrical wall portion 351D arranged to extend axially downward from an outer circumferential portion thereof. The wall portion 351D is arranged to cover an outer circumferential surface of an inertia portion 36D from an upper end to a lower end thereof. In addition, the wall portion 351D is arranged to cover at least a portion of an outer circumferential surface of a rotor hub 32D. That is, both the inertia portion 36D and the rotor hub 32D are fitted radially inside of the wall portion 351D. In other words, both the inertia portion 36D and the rotor hub 32D are fitted in a hole defined by an inside surface of the wall portion 351D. This reduces the likelihood that relative positions of the flywheel 35D, the inertia portion 36D, and the rotor hub 32D will be disturbed. This contributes to further reducing swinging of a rotating portion 3D while the motor 1D is running.

Note that the wall portion 351D may not necessarily be cylindrical. For example, the flywheel 35D may include a plurality of arc-shaped wall portions arranged in the circumferential direction in place of the cylindrical wall portion 351D.

In the example modification illustrated in FIG. 9, an outside radius r1 of the flywheel 35D is arranged to be greater than an outside radius r2 of the rotor hub 32D. When the radius r1 of the flywheel 35D is large as described above, a swing of the rotating portion 3D tends to more easily occur while the motor 1D is running. However, in this motor 1D, a center 30D of gravity of the rotating portion 3D is arranged at a level equivalent to the level of a joining portion 321D. This contributes to preventing a swing of the rotating portion 3D from causing damage, such as, for example, a rupture, to the joining portion 321D.

Figure 10:
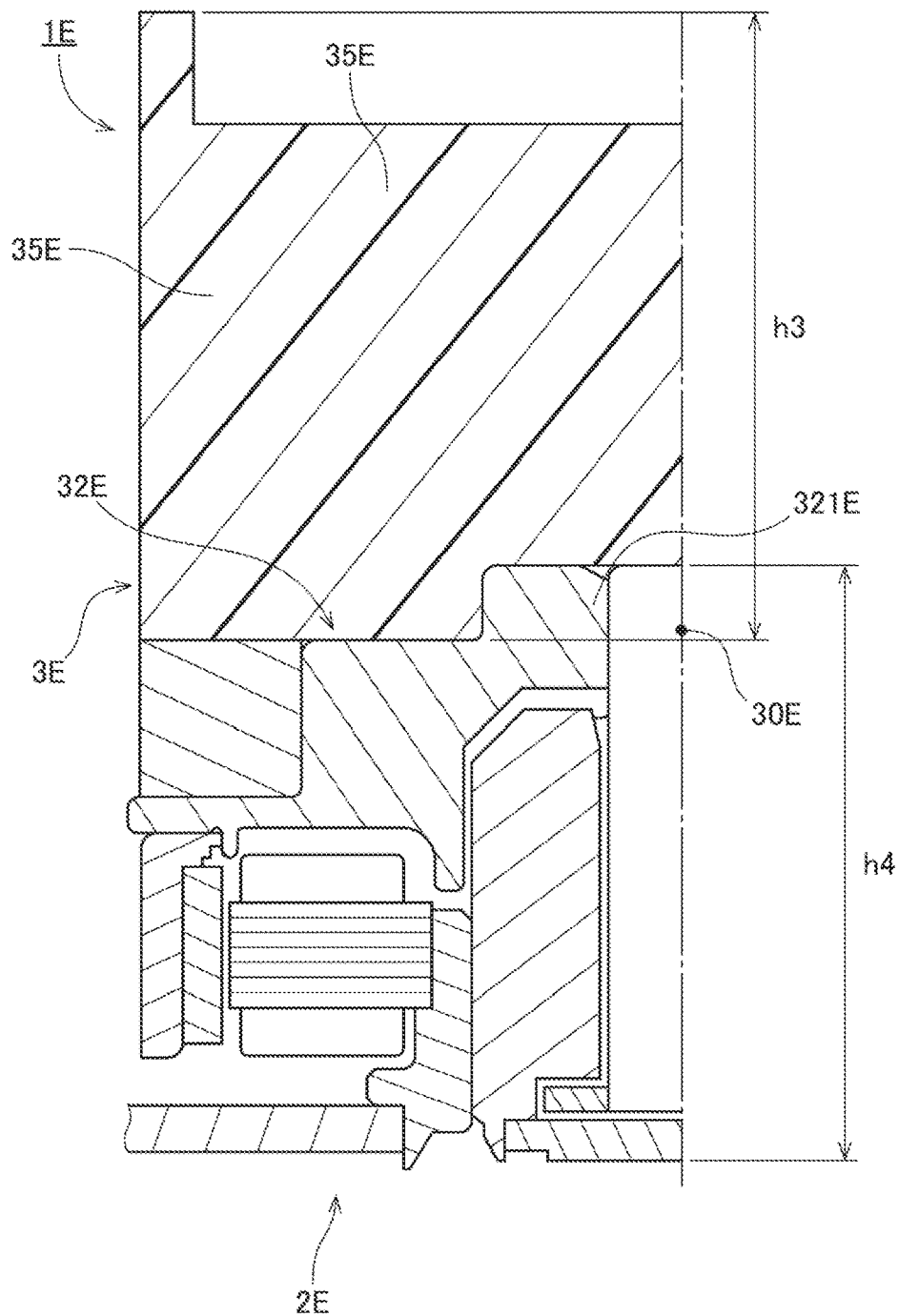
FIG. 10 is a partial vertical cross-sectional view of a motor according to an example modification of the second preferred embodiment of the present invention.

FIG. 10 is a partial vertical cross-sectional view of a motor 1E according to yet another example modification of the above-described preferred embodiment of the present invention. In the example modification illustrated in FIG. 10, an axial dimension h3 of a flywheel 35E is greater than an axial distance h4 from a lower end surface of a stationary portion 2E to an upper end surface of a rotor hub 32E. When the axial dimension h3 of the flywheel 35E is large as described above, a swing of a rotating portion 3E tends to more easily occur while the motor 1E is running. However, in this motor 1E, a center 30E of gravity of the rotating portion 3E is arranged at a level equivalent to the level of a joining portion 321E. This contributes to more effectively preventing a swing of the rotating portion 3E from causing damage, such as, for example, a rupture, to the joining portion 321E.

Figure 11:
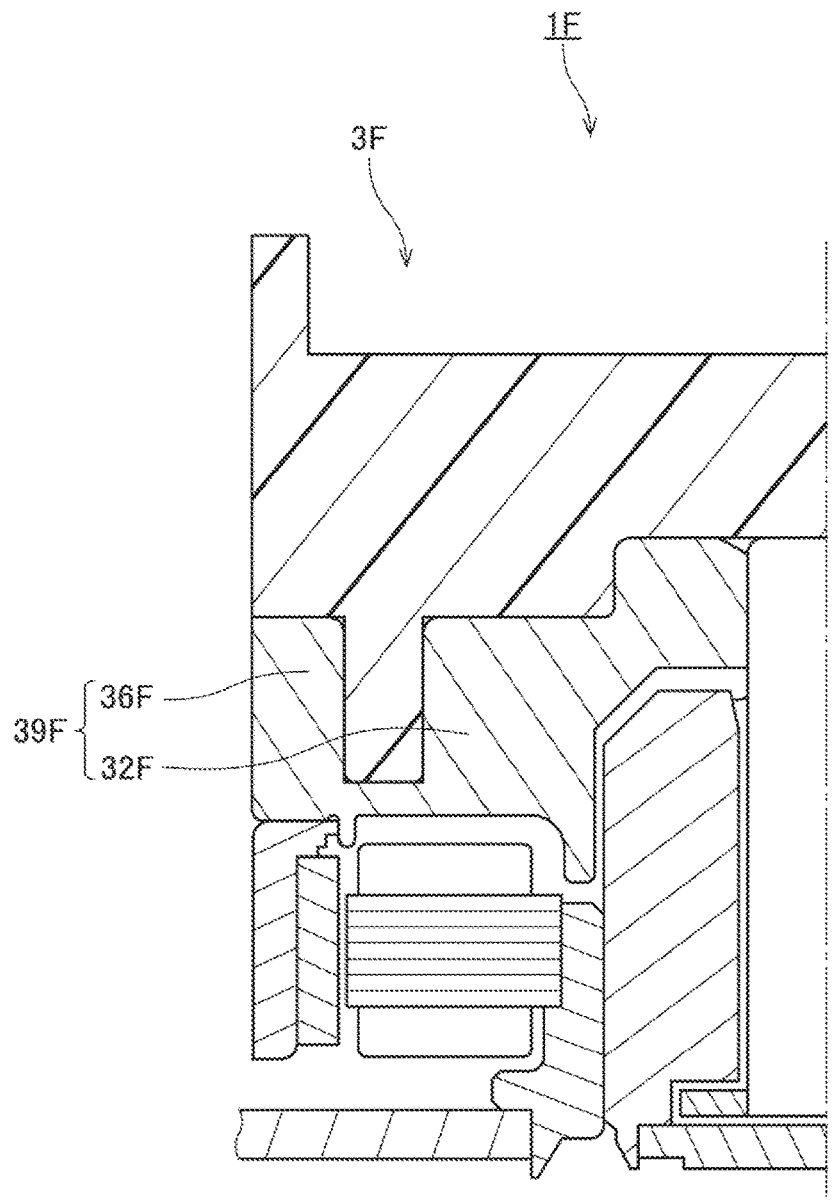
FIG. 11 is a partial vertical cross-sectional view of a motor according to an example modification of the second preferred embodiment of the present invention.

FIG. 11 is a partial vertical cross-sectional view of a motor 1F according to yet another example modification of the above-described preferred embodiment of the present invention. A rotating portion 3F in FIG. 11 includes a rotating member 39F. The rotating member 39F is a single continuous monolithic member including a rotor hub 32F and an inertia portion 36F. A metal, such as, for example, an aluminum alloy, is used as a material of the rotating member 39F. The number of parts of the motor 1F can thus be reduced when compared to the case where a rotor hub and an inertia portion are produced separately. In addition, there is not a need for an operation of fixing the inertia portion 36F to the rotor hub 32F. This reduces the number of processes to manufacture the motor 1F.

Figure 12:
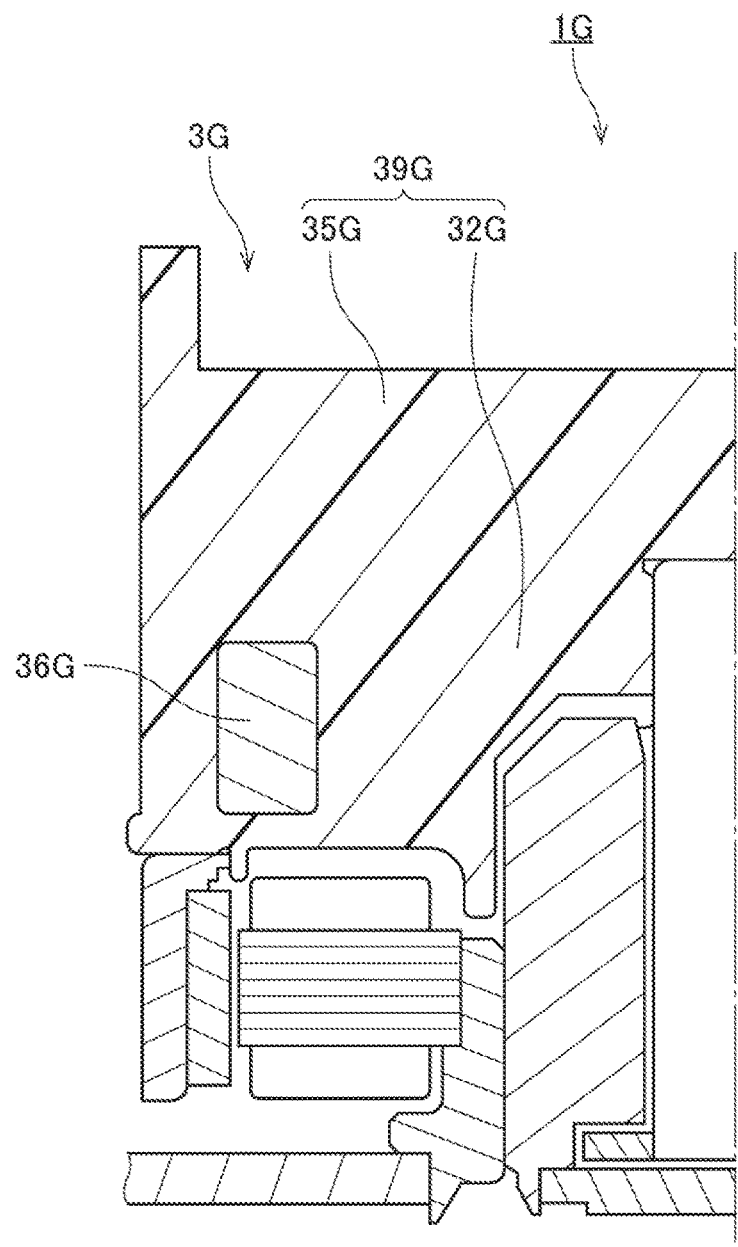
FIG. 12 is a partial vertical cross-sectional view of a motor according to an example modification of the second preferred embodiment of the present invention.

FIG. 12 is a partial vertical cross-sectional view of a motor 1G according to yet another example modification of the above-described preferred embodiment of the present invention. A rotating portion 3G in FIG. 12 includes a rotating member 39G. The rotating member 39G is a single continuous monolithic member including a rotor hub 32G and a flywheel 35G. The number of parts of the motor 1G can thus be reduced when compared to the case where a rotor hub and a flywheel are produced separately. In addition, there is not a need for an operation of fixing the flywheel 35G to the rotor hub 32G. This reduces the number of processes to manufacture the motor 1G. The rotating member 39G may be, for example, a casting or an injection molded article produced with an inertia portion 36G as an insert. This allows the rotating member 39G and the inertia portion 36G to be securely fixed to each other while achieving a reduction in the number of processes to manufacture the motor 1G.

Figure 13:
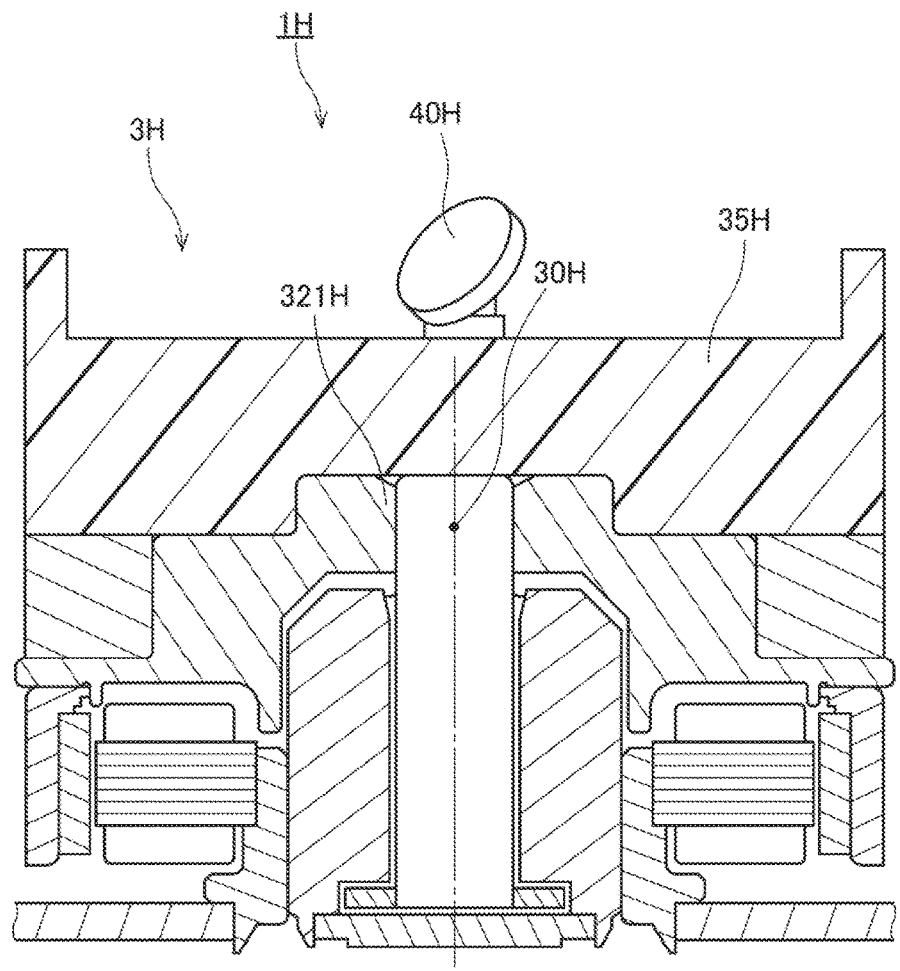
FIG. 13 is a vertical cross-sectional view of a motor according to an example modification of the second preferred embodiment of the present invention.

FIG. 13 is a vertical cross-sectional view of a motor 1H according to yet another example modification of the above-described preferred embodiment of the present invention. In the example modification illustrated in FIG. 13, a rotating portion 3H includes a mirror 40H. The mirror 40H is supported by a flywheel 35H. Once the motor 1H is driven, the mirror 40H is caused to rotate together with the flywheel 35H. Accordingly, the motor 1H allows light incident on the mirror 40H to be reflected while deflecting the light with a fixed cycle. In addition, in the example modification illustrated in FIG. 13, a center 30H of gravity of the rotating portion 3H including the mirror 40H is arranged at a level equivalent to the level of a joining portion 321H. This contributes to preventing a swing of the rotating portion 3H from causing damage, such as, for example, a rupture, to the joining portion 321H.

Figure 14:
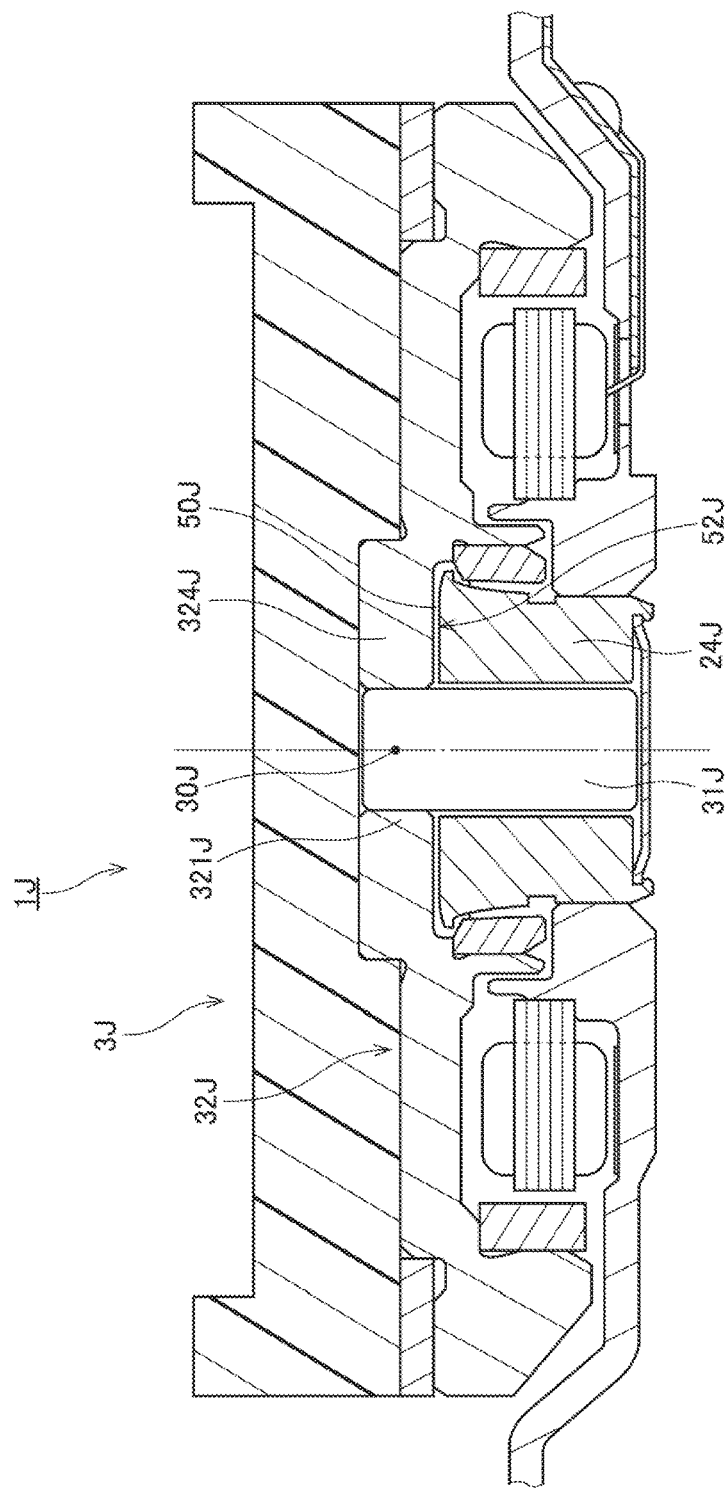
FIG. 14 is a vertical cross-sectional view of a motor according to an example modification of the second preferred embodiment of the present invention.

FIG. 14 is a vertical cross-sectional view of a motor 1J according to yet another example modification of the above-described preferred embodiment of the present invention. In the example modification illustrated in FIG. 14, a rotor hub 32J includes an annular portion 324J arranged around an upper end portion of a shaft 31J. A lower surface of the annular portion 324J is arranged axially opposite to an upper surface of a sleeve 24J with a slight gap therebetween. In the example modification illustrated in FIG. 14, a lubricating oil 50J is arranged also in this gap between the lower surface of the annular portion 324J and the upper surface of the sleeve 24J. A thrust groove array is defined in one of the lower surface of the annular portion 324J and the upper surface of the sleeve 24J. While the motor 1J is running, the thrust groove array induces a dynamic pressure in a portion of the lubricating oil 50J which is present between the lower surface of the annular portion 324J and the upper surface of the sleeve 24J. This produces an axial supporting force between the sleeve 24J and the rotor hub 32J.

That is, in the motor 1J illustrated in FIG. 14, the lower surface of the annular portion 324J is arranged axially opposite to the upper surface of the sleeve 24J with the lubricating oil 50J arranged therebetween. A thrust bearing portion 52J is thus defined. A gap including a radial bearing portion 51J and the thrust bearing portion 52J is continuously filled with the lubricating oil 50J.

Also in the example modification illustrated in FIG. 14, a center 30J of gravity of a rotating portion 3J and a joining portion 321J of the rotor hub 32J are arranged to radially overlap with each other. Accordingly, the center 30J of gravity is located axially above the thrust bearing portion 52J. Thus, also in the structure illustrated in FIG. 14, the center 30J of gravity is arranged at a level equivalent to the level of the joining portion 321J, and this contributes to preventing a swing of the rotating portion 3J from causing damage to the joining portion 321J.

Note that details of the structure and the shape of a motor according to a preferred embodiment of the present invention may differ from details of the structure and the shape of each motor as illustrated in the accompanying drawings of the present application.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a stationary portion; and
   a rotating portion supported to be rotatable about a central axis extending in a vertical direction with respect to the stationary portion; wherein
   the rotating portion includes:
      a shaft arranged to extend along the central axis;
      a rotor hub arranged to extend in an annular shape around the shaft; and
      a flywheel arranged axially above the rotor hub;
   the stationary portion includes a sleeve arranged to rotatably support the shaft;
   the motor further comprises a radial bearing portion where the sleeve and the shaft are arranged radially opposite to each other with a lubricating oil arranged therebetween;
   the rotor hub includes a joining portion fixed to an outer circumferential surface of the shaft axially above the radial bearing portion; and
   a center of gravity of the rotating portion and the joining portion are arranged to radially overlap with each other.

2. The motor according to claim 1, wherein
   the rotating portion further includes an annular inertia portion; and
   the inertia portion is arranged to have a predetermined gravity greater than a predetermined gravity of the flywheel.

3. The motor according to claim 2, wherein at least a portion of the inertia portion and at least a portion of the joining portion are arranged to radially overlap with each other.

4. The motor according to claim 2, wherein at least a portion of the inertia portion and at least a portion of the radial bearing portion are arranged to radially overlap with each other.

5. The motor according to claim 2, wherein the inertia portion is arranged to have a mass greater than a mass of the flywheel.

6. The motor according to claim 2, wherein the flywheel is made of a resin, while the inertia portion is made of a metal.

7. The motor according to claim 2, wherein
   the rotor hub includes:
      a cylindrical portion arranged to extend in an axial direction, and arranged radially inward of the inertia portion; and
      a flange portion arranged to extend radially outward from the cylindrical portion axially below the inertia portion; and
   a lower surface of the inertia portion is arranged to be in contact with an upper surface of the flange portion.

8. The motor according to claim 2, wherein the flywheel includes a wall portion arranged to cover at least a portion of an outer circumferential surface of the inertia portion.

9. The motor according to claim 8, wherein the wall portion is arranged to cover the outer circumferential surface of the inertia portion from an upper end to a lower end thereof, and at least a portion of an outer circumferential surface of the rotor hub.

10. The motor according to claim 1, wherein the flywheel is arranged to have an outside diameter greater than an outside diameter of the rotor hub.

11. The motor according to claim 1, wherein the flywheel is arranged to have an axial dimension greater than an axial distance from a lower end surface of the stationary portion to an upper end surface of the rotor hub.

12. The motor according to claim 1, wherein
    the radial bearing portion includes:
       an upper radial bearing portion; and
       a lower radial bearing portion arranged axially below the upper radial bearing portion; and
    the upper radial bearing portion is arranged to have an axial dimension greater than an axial dimension of the lower radial bearing portion.

13. The motor according to claim 1, further comprising a thrust bearing portion where the stationary portion and the rotating portion are arranged axially opposite to each other with the lubricating oil arranged therebetween.

14. The motor according to claim 13, wherein
    the rotating portion further includes a thrust plate arranged to extend radially outward from a lower end of the shaft, and including an upper surface arranged axially opposite to a lower surface of the sleeve;
    the thrust bearing portion is defined between the lower surface of the sleeve and the upper surface of the thrust plate; and
    a gap including the radial bearing portion and the thrust bearing portion is continuously filled with the lubricating oil.

15. The motor according to claim 13, wherein
    the rotor hub further includes an annular portion arranged around the shaft, and including a lower surface arranged axially opposite to an upper surface of the sleeve;
    the thrust bearing portion is defined between the upper surface of the sleeve and the lower surface of the annular portion; and
    a gap including the radial bearing portion and the thrust bearing portion is continuously filled with the lubricating oil.

16. The motor according to claim 15, wherein the center of gravity of the rotating portion is arranged axially above the thrust bearing portion.

17. The motor according to claim 1, wherein the shaft is press fitted radially inside of the joining portion, with an adhesive arranged between the shaft and the joining portion.

18. The motor according to claim 1, wherein the rotating portion further includes a mirror supported by the flywheel.

* * * * *